(12) United States Patent
Kim et al.

(10) Patent No.: US 8,176,057 B2
(45) Date of Patent: May 8, 2012

(54) ASSESSMENT OF A USER REPUTATION AND A CONTENT RELIABILITY

(75) Inventors: Laehyun Kim, Seoul (KR); Yo-Sub Han, Seoul (KR); Hyunchul Cho, Seoul (KR); Jeong Won Cha, Changwon-si (KR); Lisa Wiyartanti, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 280 days.

(21) Appl. No.: 12/603,709

(22) Filed: Oct. 22, 2009

(65) Prior Publication Data

US 2010/0257183 A1 Oct. 7, 2010

(30) Foreign Application Priority Data

Apr. 1, 2009 (KR) .................. 10-2009-0028288

(51) Int. Cl.
*G06F 17/30* (2006.01)
(52) U.S. Cl. ........ 707/751; 707/706; 707/736; 707/758; 707/781; 726/3; 726/21; 705/1
(58) Field of Classification Search .................. None
See application file for complete search history.

(56) References Cited

U.S. PATENT DOCUMENTS

| | | | | |
|---|---|---|---|---|
| 6,892,178 | B1 * | 5/2005 | Zacharia ..................... | 705/7.29 |
| 6,892,179 | B1 * | 5/2005 | Zacharia ..................... | 705/4 |
| 7,734,609 | B2 * | 6/2010 | Manfredi et al. ............ | 707/705 |
| 7,813,965 | B1 * | 10/2010 | Robinson et al. ........... | 705/26.1 |
| 7,844,671 | B1 * | 11/2010 | Lawler et al. ............... | 709/206 |
| 8,001,582 | B2 * | 8/2011 | Hulten et al. ................ | 726/3 |
| 8,010,460 | B2 * | 8/2011 | Work et al. .................. | 705/319 |
| 2002/0133361 | A1 * | 9/2002 | Kindell et al. ............... | 705/1 |
| 2006/0042483 | A1 * | 3/2006 | Work et al. .................. | 101/91 |
| 2006/0253584 | A1 * | 11/2006 | Dixon et al. ................. | 709/225 |
| 2007/0078675 | A1 * | 4/2007 | Kaplan ......................... | 705/1 |
| 2007/0130350 | A1 * | 6/2007 | Alperovitch et al. ....... | 709/229 |
| 2007/0255753 | A1 * | 11/2007 | Pomerantz ................... | 707/104.1 |
| 2008/0109491 | A1 * | 5/2008 | Gupta ............................ | 707/104.1 |
| 2008/0133657 | A1 * | 6/2008 | Pennington ................... | 709/204 |
| 2009/0070130 | A1 * | 3/2009 | Sundaresan et al. ........ | 705/1 |
| 2010/0198836 | A1 * | 8/2010 | Glass et al. ................... | 707/748 |

OTHER PUBLICATIONS

Agarwal et al, "Identifying the Influental Bloggers in a Community", ACM, 2008.*
Chu et al, "Technology Assessment: User-Created Content Hype, or sustainable business model?", Tech Assesment, 2007.*
Steven Hetcher, "User-generated Content and the Future of Copyright: Part Two-Agreements Between Users and Mega-sites", 2008.*

* cited by examiner

*Primary Examiner* — Hung Le
(74) *Attorney, Agent, or Firm* — NSIP Law

(57) ABSTRACT

A method and system for assessing a user reputation and/or a content reliability on contents sharing web sites is provided. In one embodiment, the method includes defining a networked association between users based on social activity information related to the users' social activities on a contents sharing web site, the users' social activities including social activities between the users and/or social activities of the users on the contents sharing web site; obtaining a link relation for at least one of the users based on the networked association; and computing a user reputation for the at least one of the users based on the link relation. The method may further include computing a content reliability of the at least one user-created contents based on the computed user reputation.

18 Claims, 6 Drawing Sheets

| Contents ID | URL | Creator ID | Date | Title | Tag | Description | Ratings | Hits | Favorited |

FIG. 4

| User ID | Name | Age | Sex | Contents ID list | Subscription ID list | Favorite contents ID list | Scored Contents ID list | Comments provided contents ID list | User Reputation |

224

ASSESSMENT OF A USER REPUTATION AND A CONTENT RELIABILITY

CROSS-REFERENCE TO RELATED APPLICATION

This application claims the benefit under 35 U.S.C. §119 (a) of Korean Patent Application No. 10-2009-0028288 filed on Apr. 1, 2009, in the Korean Intellectual Property Office, the entire disclosure of which is incorporated herein by reference for all purposes.

TECHNICAL FIELD

The invention generally relates to an apparatus and method for assessing a user reputation and a content reliability.

BACKGROUND

In recent years, modes of providing and using website content have been changing rapidly. At the outset, most of the contents were provided by a few professional content authors in the same manner as was done for conventional media, whereas most web users only consumed or used the created contents. However, with the advent of WEB 2.0, which is focused on user participation and user cooperation, general users began to participate in creating web contents, and the user created contents (UCC) were uploaded to web blogs or web sharing sites for consumption by other users. Therefore, the proportion of the user created content to the total web content is increasing. The UCC can be found in blogs, web forums, and other sites for sharing photos and videos. Many users are providing the contents created by themselves through the social network platform. With this explosive increase in providing UCC, it is necessary to provide technology for searching and recommending good quality contents among the huge amount of UCCs.

Conventional services, such as movie information providing services or video content providing services, provide sufficient textual information on movies or videos, such as the title, summary, actors/actresses, awards etc. Thus, the user is able to easily choose between the content based on this textual information or contents classification according to the times of creation or genres of contents can be provided with users to facilitate searching content. However, unlike the conventional content created by professionals, standardized metadata and classified contents may not be ensured to be provided in UCCs. That is, although there may be only a small difference in quality between the content provided by a limited number of suppliers such as professionals, the content quality of the UCCs may vary greatly, ranging from a very low level to the expert level. Therefore, both filtering and ranking contents are useful in providing UCCs.

In an environment where the users participate in many interactions between one another and/or between the user and contents, the user activities may provide clues for estimating the quality of the UCCs of the participating user. Therefore, it is preferable to conduct a search into information on the relationships between the users, between the users and the contents, as well as information on the contents.

Conventionally, keyword-based search algorithms, such as PageRank™, TrustRank™, Anti-Trust Rank™, and XRank™, have been used to search web page information. Specifically, the PageRank™ algorithm iterates the importance computation to the hyperlinked documents, following the links. In the PageRank™ algorithm, a document is rated as having higher importance and is thus promoted to a higher rank, if it is hyperlinked by multiple other documents. The TrustRank™ algorithm provides a method in which a set of reliable web documents is first decided, and spam web documents are removed through complex linking schemes similar to the scheme found in the PageRank™ algorithm. In the Anti-Trust Rank algorithm, a trust score is propagated in the reverse direction along the incoming links, starting from a seed set of untrustworthy spam documents. Finally, the XRank™ algorithm computes the importance and the popularity of the web documents separately and uses the computed importance and popularity for ranking purpose, in contrast to the above algorithms, which determine the importance of the web documents based on the link relation.

The above keyword-based search algorithms, however, cannot be directly applied to the UCCs because the UCCs include little textual information. That is, the documents, to which the above algorithms are applicable, should be configured by one kind of a hyperlink in the networks but the UCCs have various kinds of links depending on the user interactions in the social network. Further, the UCCs involve various data, which the web documents do not have, so that it may not be possible to obtain a high accuracy search result for the UCCs without taking into account various data. In addition, it is almost impossible to select the good quality contents among the increasing number of UCCs with insufficient number of workers who are engaged in rating the quality of UCCs. Therefore, there is a need to provide an algorithm for determining and searching the high quality UCCs based on information related to the UCCs.

SUMMARY

In one embodiment, a computer-implemented method includes defining a networked association between users based on social activity information related to the users' social activities on a contents sharing web site, the users' social activities including social activities between the users and social activities of the users on the contents sharing web site; obtaining a link relation for at least one of the users based on the networked association; and computing a user reputation for the at least one of the users based on the link relation.

In one embodiment, a content reliability assessing system includes defining a networked association between users based on social activity information related to the users' social activities on a contents sharing web site, the users' social activities including social activities between the users and social activities of the users on the contents sharing web site; obtaining a link relation for at least one of the users based on the networked association; and computing a user reputation for the at least one of the users based on the link relation.

BRIEF DESCRIPTION OF THE DRAWINGS

FIG. 3 shows an illustrative embodiment of a contents database.

FIG. 4 shows an illustrative embodiment of a user database.

DETAILED DESCRIPTION

Figure 1:
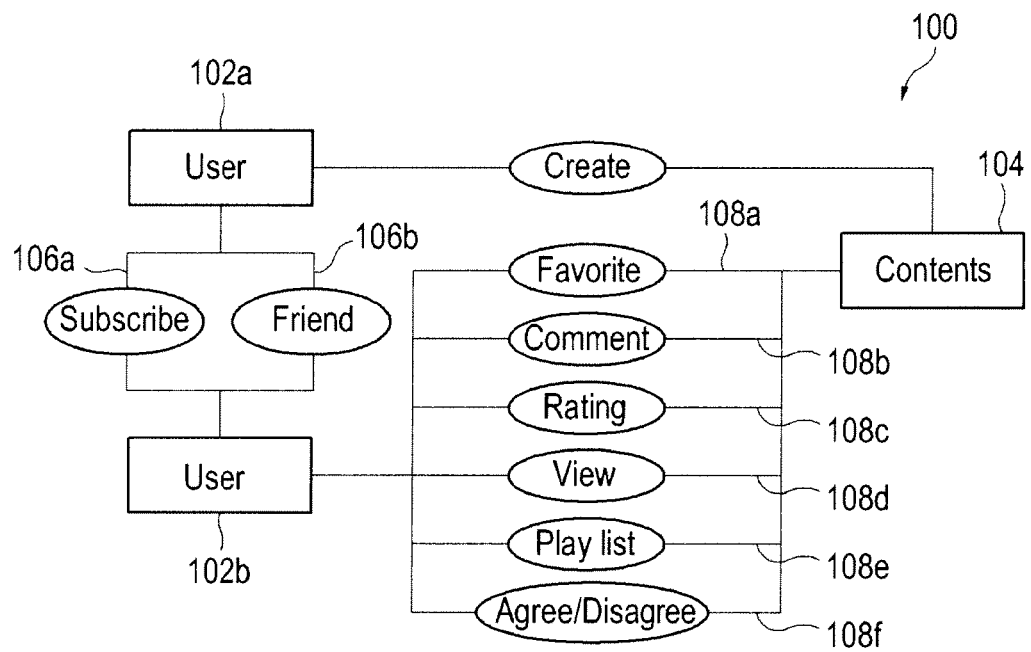
FIG. 1 is a schematic diagram showing an illustrative embodiment of social activities between users and between a user and a content, which constitute a social network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

FIG. 1 is a schematic diagram showing illustrative interactions (i.e., social activities) between users and between users and contents, which constitute a social network 100. In the social network 100, the users 102a and 102b may have their own channels or personal pages (hereinafter, "channel(s)") which can be accessed by others. In some embodiments, the users 102a and 102b may create and upload contents 104 on the User Created Content (UCC) sharing website through their own channels to allow the user 102b to share them (hereinafter, "Create" activity).

In some embodiments, the social network 100 may include at least one of direct links 106a and 106b between the users 102a and 102b. Referring to FIG. 1, the direct links 106a may be constituted by a social activity that at lease one of the users 102a and 102b subscribes to the channel of the other (hereinafter, "Subscribe" activity) to view all or some of the contents provided through the channel of the other. Further, the direct link 106b may be constituted by a social activity that the users 102a and 102b register each other as friends (hereinafter, "Friend" activity). Although FIG. 1 shows that the social network 100 includes two direct links 106a and 106b, i.e., "Subscribe" activity and "Friend" activity, it will be appreciated that the social network 100 may include either any one of the direct links 106a and 106b or both of the direct links 106a and 106b. Further, the social network 100 may include not only the direct links constituted from the "Subscribe" activity and the "Friend" activity but also various direct links constituted from any other social activities between the users 102a and 102b.

In some embodiments, the social network 100 may include indirect links 108a to 108e between and the users 102a and 102b via the content 104. Referring to FIG. 1, the indirect link 108a may be constituted by the social activity of adding the content 104 to the user's favorites (hereinafter, "Favorite" activity). The indirect link 108b may be constituted by the social activity of providing comments (in any type of form, such as a text, an image, a sound and a video) to the contents 104 (hereinafter, "Comment" activity). The indirect link 108c may be constituted by the social activity of rating the content 104 (hereinafter, "Rating" activity). The indirect link 108d may be constituted by the social activity of viewing the content 104 (hereinafter, "View" activity). The indirect link 108e may be constituted by the social activity of adding the content 104 to the user's playlist (hereinafter, "Playlist" activity). The indirect link 108e may be constituted by a social activity of providing agreement/disagreement to the comment provided by other user (hereinafter, "Agree/Disagree" activity). Although FIG. 1 shows that the social network 100 includes the indirect links 108a to 108f, it will be appreciated that the social network may include at least one of the indirect links 108a to 108f. Furthermore, the social network 100 may include various indirect links, which may be constituted by other social activities made between the content 104 and the user 102a or 102b, such as assessing and honoring/awarding the content 104.

FIG. 1 illustrates that the user 102a is a content author who creates and uploads the content 104 on the UCC sharing website, and the user 102b is a content viewer/reviewer who assesses and/or provides comments on the content 104. However, any user included in the social networks 100 may behave as both a content author and a content reviewer.

Figure 2:
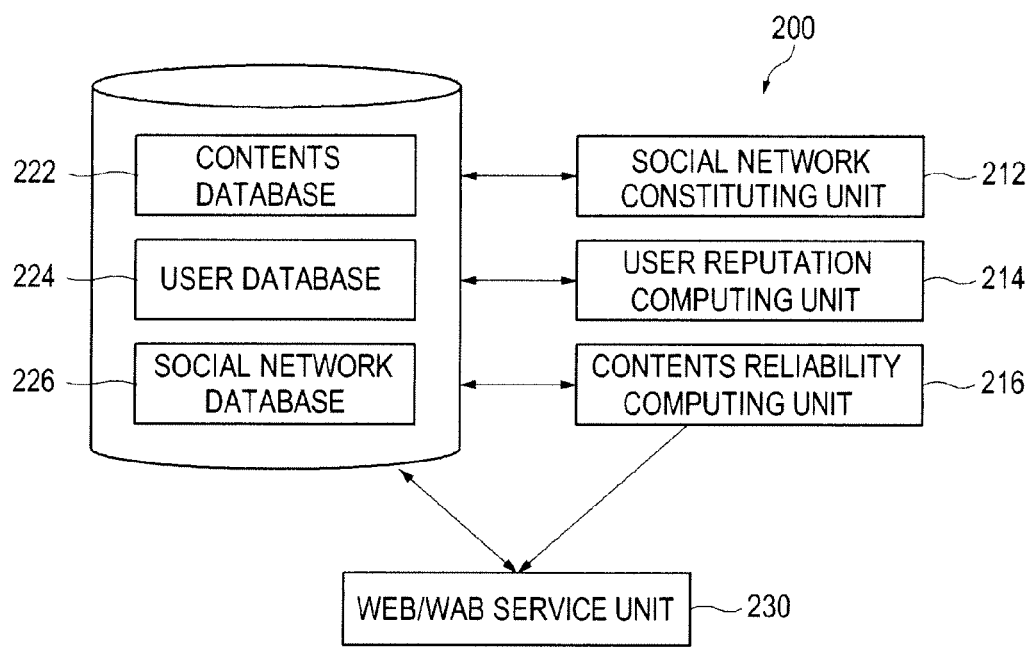
FIG. 2 is a schematic block diagram showing an illustrative embodiment of a content reliability assessing system.

FIG. 2 shows an illustrative embodiment of a content reliability assessing system 200 for providing a user reputation and a content reliability on the social network 100. As shown in FIG. 2, the content reliability assessing system 200 may further have a contents database 222 for storing metadata related to contents, a user database 224 for storing data related to the user (including social activities of the user), and a social network database 226 for storing social network information related to links between the users.

In some embodiments, the content reliability assessing system 200 may have a social network constituting unit 212 for constituting a social network based on social activity information, a user reputation computing unit 214 for computing a user reputation based on the constituted social network, and a content reliability computing unit 216 for computing a content reliability (i.e., the quality of a content) based on the user reputation. In some embodiments, the social network constituting unit 212 may define a networked association between users based on the data stored in the contents database 222 and the user database 224 to constitute the social network. In some embodiments, the social network constituting unit 212 may store the networked association as the social network information in the social network database 226. In some embodiments, the user reputation computing unit 214 may obtain a link relation for at least one of the users based on the social network information, and computes the user reputation based on the link relation.

In some embodiments, the content reliability assessing system 200 may further have a WEB/WAB service unit 230 for managing data storage in and retrieval from the databases 222, 224 and 226 and for providing UCC services to WEB/WAP users. In some embodiments, the WEB/WAB service unit 230 may recommend high quality contents when providing UCC services. For example, the WEB/WAB service unit 230 may provide a UCC search result where contents are sorted according to the content reliability computed by the content reliability computing unit 216.

Referring to FIG. 3, the contents database 222 may store basic content information such as a content identification ("content ID"), a content URL ("URL"), a content author ID ("Creator ID"), a date created ("Date"), a content title ("Title"), a tag list ("Tag"), a text description ("Description") and the like. In some embodiments, if the contents are uploaded to the UCC sharing website, the basic contents information of the uploaded contents may be stored in the contents database 222.

In some embodiments, the contents database 222 may further store information related to the social activities on the contents (hereinafter, "non-link information"). In some embodiments, the non-link information may include one or more of non-link items. Referring to FIG. 3, "Ratings," "Hit Count" and "Favorited Count" are non-link items in the contents database 222. The term "Ratings" is used to refer to viewer's ratings of the content, the term "Hit Count" may refer to a count indicative of the number of viewers of the content and the term "Favorited Count" may refer to a count indicative of the number of times the content is added to the users' favorites. In some embodiments, the Hit Count may be an average daily hit count, which may be computed by dividing the total hit count of the content by the duration of public availability of the corresponding content. In some embodiments, the Favorited Count may be an average daily favorited count, which is computed by dividing the total favorited count of the content by the duration of public availability of the corresponding content. In some embodiments, when a content is created and uploaded on the contents sharing web site, corresponding data related to the content may be stored in the contents database 222.

Referring to FIG. 4, the user database 224 may store an individual user's basic information, such as a user ID, Name, Age, Sex and the like. Further, the user database 224 may store ID lists related to the user's social activity. In some embodiments, the ID lists may include one or more of the following: an ID list of contents created by the user (hereinafter, "Content ID list"); an ID list of other users who subscribe to the user's channel (hereinafter, "Subscription ID list"); an ID list of contents which are added to the user's favorites (hereinafter, "Favorite content ID list"); an ID list of contents which are scored by the user (hereinafter, "Scored content ID list") and an ID list of contents on which the user provided comments (hereinafter, "Comments provided content ID list"). In some embodiments, the user database 224 may further store the User Reputation which is computed by the user reputation computing unit 214, which will be described below. However, it will be appreciated that the ID lists may be modified in various ways. For example, the ID lists may be modified to further include ID lists of the contents which are viewed by the users and which are added to the user's play list.

In some embodiments, the data in the contents database 222 or the user database 224 may be stored/updated in response to the user's conduct of the social activity. For example, when a user A subscribes to the channel of a user B on the contents sharing website, user A's ID is stored in user B's subscription ID list in the user database 224. For another example, when a user C adds content Z of a user D to his favorites, content Z's ID is stored in the favorite contents ID list of the user C in the user database 224. Finally, when a user E scores content Y of a user F, content Y's ID is stored in the scored contents ID list of the user E. Similarly, the ID lists may be stored/updated in response to the user's conduct of the corresponding social activity.

Figure 5:
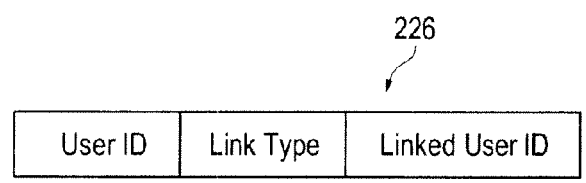
FIG. 5 shows an illustrative embodiment of a social network database.

In some embodiments, the social network database 226 may store the social network information related to the links between the users. Referring to FIG. 5, the social network information may include a link type indicative of a type of the social activities and participating users' IDs ("user ID" and "linked user ID"). In some embodiments, the link type may indicate a direct link type, such as a subscription link, which indicates "Subscribe" activity, and a friend link, which indicates the "Friend" activity. In some embodiments, the link type may indicate an indirect link type, such as a favorite link, which indicates the "Favorite" activity, a rating link, which indicates the "Rating" activity, a comment link, which indicates "Comment" activity, a view link, which indicates "View" activity, and a playlist link, which indicates "Playlist" link. In some embodiments, when the link type is the indirect link type, a linked content ID may be stored as a linked user ID.

In some embodiments, the social network constituting unit 212 may constitute the social network, where a networked association between users is defined. In some embodiments, the social network may have nodes corresponding to the users and direct and/or indirect links made between the users. In some embodiments, the direct link may be the subscription link or the friend link. In some embodiments, the indirect link may be the favorite link, rating link, the comment link, the view link and the playlist link.

In some embodiments, the social network constituting unit 212 may use the social activity information. In some embodiments, the social network constituting unit 212 may use the data stored in the user database 224 as the social activity information. In some embodiments, the social network constituting unit 212 may retrieve the user database 224, and constitute the social network including the direct link based on the corresponding ID list. For example, the social network constituting unit 212 may retrieve user B's subscription ID list in the user database 224, and store "Subscribe" activity as the link type in the social network database 226 along with the user IDs of users A and user B. Similarly, the social network constituting unit 212 may constitute the social network including the friend link.

In some embodiments, the social network constituting unit 212 may use the data stored in the contents database 222 and the user database 224, as the social activity information. In some embodiments, the social network constituting unit 212 may retrieve contents listed in the ID lists from the user database 224 and refer to the data related to the retrieved contents stored in the contents database 222, and then define the social network including the indirect link based on thereon. For example, the social network constituting unit 212 may retrieve the contents listed in user C's favorite contents ID list from the user database 224, refer to the creator ID of the retrieved contents, and then store the link type of "favorites" in the social network database 226 along with the user C's ID and the creator D's ID. Similarly, the social network constituting unit 212 may constitute the social network including at least one of the rating link, the comment link, the view link and the playlist link.

Figure 6:
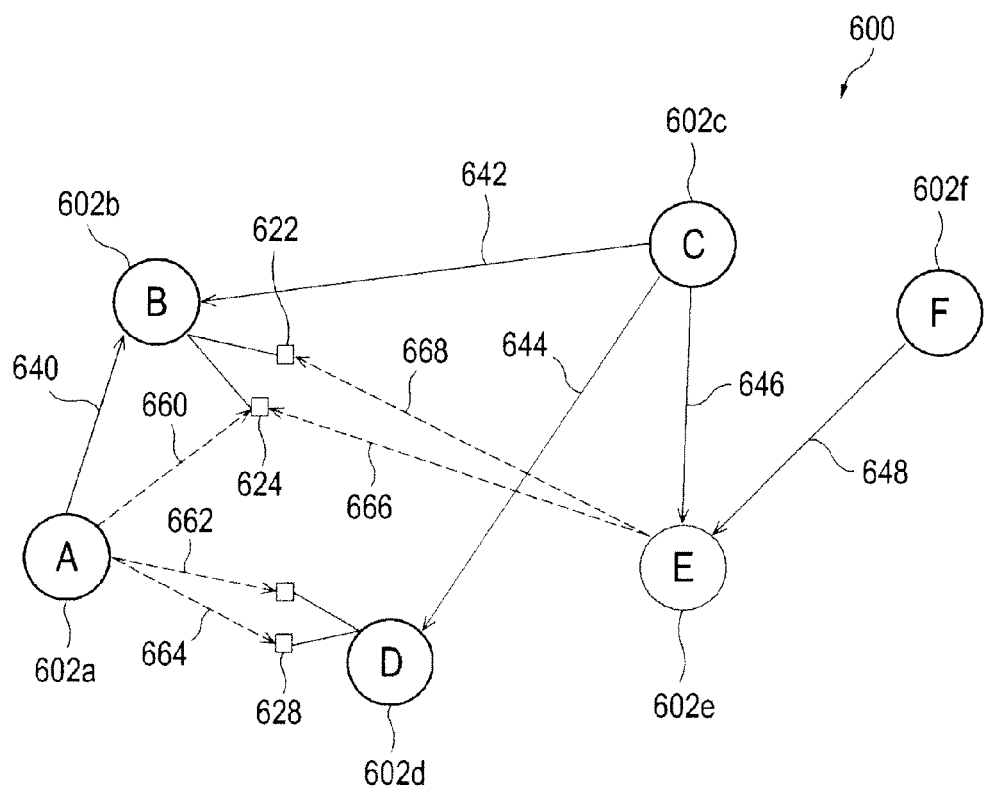
FIG. 6 illustrates an embodiment of the social network.

FIG. 6 illustrates an embodiment of a social network 600 which may be constituted by the social network constituting unit 212. The social network 600 has nodes A to F corresponding to users 602a to 602f who are participants in the social activity and whose data is stored in the user database 224. The user 602a may be an author of contents 622 and 624, and the user 602b may be an author of contents 626 and 628.

Reference numerals 640 to 648 in FIG. 6 refer to the subscription links. The subscription link 640 is made from node A to node B if the user 602a subscribes to the channel of the user 602b. The subscription links 642, 644, 646 are made from node C to nodes B, D and E if the user 602c subscribes to the channels of the users 602b, 602d and 602e. Similarly, the subscription link 648 is made from node F to node E if the user 602f subscribes to the channels of a user 602e.

Reference numerals 660 to 668 in FIG. 6 refer to the favorite links. The favorite link 660 is made from node A to node B via the content 624 if the user 602a adds the content 624 to his favorites. The favorite links 662 and 664 are made from node A to node D via the contents 626 and 628, respectively if the user 602a adds contents 626 and 628 to his favorites. Similarly, the favorite links 666 and 668 are made from node E to node B via the contents 624 and 622, respectively if the user 602e adds the contents 624 and 622 to his favorites. Although FIG. 6 illustrates the social network 600 having the subscription links and favorite links, the social network 600 may include the direct links and the indirect links which are constituted by other social activities.

In some embodiments, the user reputation computing unit 214 may obtain a link relation for at least one of the users (i.e. the nodes) from the social network information, and compute the user reputation for the at least one of the users based on the link relation. In some embodiments, the link relation may be categorized into at least one link type indicative of a type of the social activities. For example, the link relation may be categorized into a single link type indicative of the subscription link. For another example, the link relation may be categorized into a plurality of link types indicative of the friend link, the favorite link and the rating link. In some embodiments, the link relation may include a number of each type of links between the users.

In some embodiments, the user reputation computing unit 214 may compute the user reputation based on the link relation and the non-link information. The non-link information may include one or more non-link items such as the average rating, the average hit count and the average favorited count as described above. In some embodiments, the user reputation computing unit 214 may weight at least two types of the link relation and/or the at least one non-link item with respective weights according to the importance. In some embodiments, a sum of the weights may be equal to 1.

Hereinafter, the process for computing the user reputation is explained in detail.

In some embodiments, when the link relation is categorized into the subscription link(s) and the favorite link(s) from the user i to the user j, the user reputation computing unit 214 may calculate a unified link weight C $(T_{i \to j})$ as follows:

$$C(T_{i \to j}) = (W_s \times L_s) + (W_f \times L_f)$$ [Equation 1]

where $L_s$ is a number of the subscription links established from the user i to the user j, $W_s$ is a weight for the subscription links, $L_f$ is a number of the favorite links established from the user i to the user j, and $W_f$ is a weight for the favorite links. In some embodiments, the sum of the weights for the link types and/or the non-link items may be equal to 1.

Figure 7:
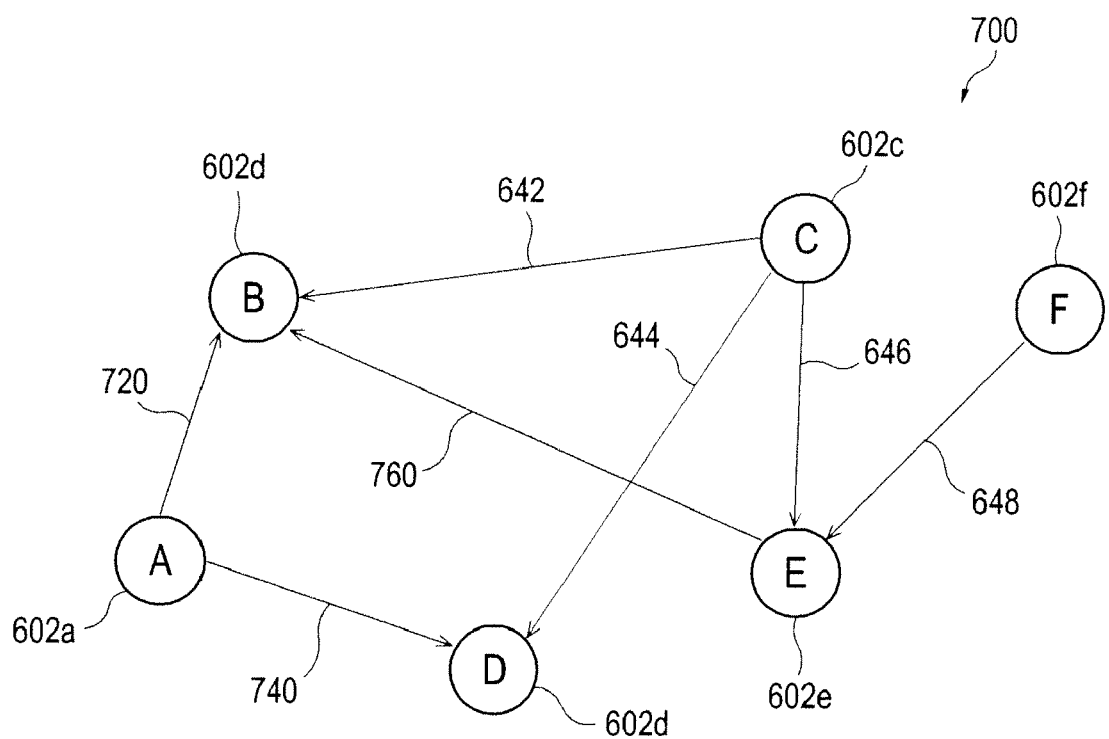
FIG. 7 illustrates an embodiment of a unified social network in which links in the social network of FIG. 6 are unified.

To provide further illustration, referring to the social network 600 illustrated in FIG. 6, if there is one subscription link 640 and one favorite link 660 between the user 602a (Node A) and the user 602b (Node B), a weight $C(T_{A \to B})$ from the user 602a (Node A) to the user 602b (Node B) may be calculated as $C(T_{A \to B}) = W_s \times 1 + W_f \times 1$, thereby unifying the subscription link 640 and the favorite link 660 into a single unified link 720 as shown in FIG. 7. Further, if there are two favorite links 662 and 664 between the user 602a (Node A) and the user 602d (Node D), a weight $C(T_{A \to D})$ from the user 602a (Node A) to the user 602d (Node D) may be calculated as $C(T_{A \to D}) = W_f \times 2$, thereby unifying the favorite links 662 and 664 into a single unified link 740 as shown in FIG. 7. Further, to unify two favorite links 666 and 668 between the user 602b (Node B) and the user 602e (Node E) into a single unified link 760 shown in FIG. 7, a weight $C(T_{B \to E})$ may be calculated in the similar manner as described above.

Then, the user reputation computing unit 214 may sum the unified link weights $C(T_{i \to j})$ from the user i to every linked user in the social network to calculate a weighted sum $C(T_i)$ for the user i. For example, the weighted sum $C(T_i)$ may be calculated as follows:

$$C(T_i) = \sum_{j=1}^{M} C(T_{i \to j})$$ [Equation 2]

For example, referring to FIG. 6, the weighted sum $C(T_A)$ for the user 602a (Node A) who has the links with the user 602b (Node B) and the user 602d (Node D) may be calculated as $C(T_A) = C(T_{A \to B}) + C(T_{A \to b}) = W_s + 3W_f$. In some embodiments, the weighted sum $C(T_i)$ may be calculated for every user in the social network.

In some embodiments, the user reputation computing unit 214 may compute a user reputation UR(U) of a user U, using the calculated unified link weight C $(T_{i \to j})$ and the weighted sum $C(T_i)$ for every user who linked to the user U. In some embodiments, the user reputation computing unit 214 may compute the user reputation UR(U) as follows:

$$UR(U) = (1-d) \times \text{Non-link} + d\left[\frac{C(T_{1 \to u})}{C(T_1)} UR(T_1) + \frac{C(T_{2 \to u})}{C(T_2)} UR(T_2) + \ldots + \frac{C(T_{n \to u})}{C(T_n)} UR(T_n)\right]$$ [Equation 3]

where, Non-link represents a factor which may be set as a value which is not related to the link relation but affects the user reputation, "d" may set to weight the link relation and the non-link information. For example, d may set to 0.85.

In some embodiments, Non-link may be the non-link information stored in the contents database 222, such as the Ratings, Hit Count and Favorited Count as described above. In another embodiment, Non-link may be set as a reciprocal of the total number of users. In some embodiments, Non-link may be set differently for each user and normalized such that the sum of the normalized Non-links of all users is equal to 1. In some embodiments, "d" may set to weight the link relation and the non-link information.

As shown in Equation 3, the user reputation UR(U) of the user U may be calculated using the user reputations $UR(T_1)$ to $UR(T_n)$ of other users, which may be also calculated by Equation 3. For example, the user reputation UR(B) of the user 602b (Node B) who has the links from the users 602a, 602c and 602e (Node A, Node C and Node E) may be calculated using Equation 3 as follows:

$$UR(B) = (1-d) \times \text{Non-link} + d\left[\frac{C(T_{A \to B})}{C(T_A)} UR(T_A) + \frac{C(T_{C \to B})}{C(T_C)} UR(T_C) + \frac{C(T_{E \to B})}{C(T_E)} UR(T_E)\right]$$

In some embodiments, a user reputation of each user may be initially set as the reciprocal of the total number of users or set as the value that is calculated from Equation 3, where Equation 3 may be solved with only a weight d and Non-link. In some embodiments, the calculated user reputation may be applied to the next user reputation calculation, and the user reputation calculation process may be iterated until the user reputations for all users satisfy a convergence condition. One example of a convergence condition may be that the sum of the squares of differences between the currently calculated user reputation and the previously calculated user reputation for each user is no greater than $10^{-14}$.

In other embodiments, when a user i has the subscription link and the favorite link with other users, the user reputation computing unit 214 may compute a user reputation $UR_i$ as follows:

$$UR_i = Ws \times Us_i + Wf \times Uf_i$$ [Equation 4]

where Ws represents a weight for subscription links, Wf represents a weight for favorites links, and $Us_i$ and $Uf_i$ represent a subscription reputation factor and a favorites factor of the user i, respectively.

In some embodiments, the sum of the subscription information weight Ws and the favorites information weight Wf may be equal to 1. In some embodiments, the subscription reputation factor $Us_i$ may be a normalization of a number of subscribers who subscribe to the channel of the user i. For example, the subscription reputation factor $Us_i$ may be calculated as follows:

$$Us_i = Ns_i / \text{Max}(Ns_0, \ldots, Ns_{n-1}) \quad \text{[Equation 5]}$$

where $Ns_i$ represents the number of subscribers who subscribe to the channel of the user i, and $\text{Max}(Ns_0, \ldots, Ns_{n-1})$ represents the maximum number of subscribers among the numbers of subscribers of "n" users. Further, the favorites factor $Uf_i$ may be a normalized value of the maximum Favorited Count of the contents of the user i. For example, the favorites factor $Uf_i$ may be calculated as follows:

$$Uf_i = Nf_i / \text{Max}(Nf_0, \ldots, Nf_{n-1}) \quad \text{[Equation 6]}$$

where $Nf_i$ represents the maximum Favorited Count among the Favorited Counts of the contents created by the user i, and $\text{Max}(Nf_0, \ldots, Nf_{n-1})$ represents the maximum Favorited Count among the Favorited Counts of "n" users.

In still other embodiments, the user reputation computing unit 214 may employ the PageRank™ Algorithm to compute the user reputation. In some embodiments, the user reputation may be calculated from the PageRank™ rating r of a content, which may be calculated as follows:

$$r = a \cdot T \cdot r + (1-a) \cdot d \quad \text{[Equation 7]}$$

In some embodiments, d in Equation 7 may set to be identical for all contents in applying the PageRank™ algorithm. In some embodiments, the variable d in Equation 7 may be defined by a vector whose components consist of the non-link information of the contents created by the corresponding user. For example, the average scores for the contents is not a social activity but may be a factor which affects the user reputation. Therefore, d in Equation 7 may be defined by the vector which consists of the average ratings for the contents created by the user. In some embodiments, a in Equation 7 may also be determined based on the importance of the non-link item used for "d".

In some embodiments, the link array T in Equation 7 may be defined to be zero if a user q does not subscribe the channel of a user p, and otherwise, defined to be a reciprocal of an out-degree $out_s(q)$ of the user q, as follows:

$$T(p, q) = \begin{cases} 0 & \text{if } (q, p) \notin \varepsilon \\ \dfrac{1}{out_s(q)} & \text{if } (q, p) \in \varepsilon \end{cases} \quad \text{[Equation 8]}$$

In some embodiments, the out-degree $out_s(q)$ may be set to the total number of users to whom the user q subscribes.

In some embodiments, the link array T in Equation 7 may be defined to zero if the user q adds no contents of the user p to favorites, and otherwise, may be defined by the multiplication of the number of contents created by the user p, which are added to the favorites of the user q, with the reciprocal of an out-degree $out_f(q)$, as follows:

$$T(p, q) = \begin{cases} 0 & \text{if } (q, p) \notin \varepsilon \\ \dfrac{n_f(q, p)}{out_f(q)} & \text{if } (q, p) \in \varepsilon \end{cases} \quad \text{[Equation 9]}$$

where $n_f(q, p)$ represents the number of contents of the user p which are added to the favorites of the user q.

In some embodiments, when the social network is constituted by two or more of different kinds of social activities, the link array T in Equation 7 may be defined with a weight for each social activity for discrimination of the social activities' effect on the user reputation. For example, when the social network is built by two social activities, e.g., the "Subscribe" activity and the "Favorite" activity, the link array T may be defined as follows, using a weight $w_s$ for a "Subscribe" activity and a weight $w_f$ for "Favorite" activity.

$$T(p, q) = \frac{(w_s \cdot n_s(q, p) + w_f \cdot n_f(q, p))}{W(q)} \quad \text{[Equation 10]}$$

In Equation 8, $n_s(q,p)$ is a function which is defined by 1 if the user q subscribes the channel of the user p, and defined by "0" otherwise, and $W(q)$ is a weighted sum for all links from the user q. In some embodiments, $W(q)$ may be defined as follows:

$$W(q) = w_s \cdot out_s(q) = w_f \cdot out_f(q) \quad \text{[Equation 11]}$$

where $w_s$ and $w_f$ are a weight for a "Subscribe" activity and "Favorite" activity, respectively, $out_s(q)$ is the number of users of the channel which is subscribed to by the user q, and $out_f(q)$ is the number of contents which is added to the favorites of the user q. In some embodiments, some of the weights for the social activities may be set differently and the others may be set to a same value.

In some embodiments, Equation 7 may be iterated until the PageRank™ rating r converges and the PageRank™ rating r may be finally determined to the converged the PageRank™ rating r. In some embodiments, the user reputation computing unit 214 may perform the user reputation computation regularly as described above, at a periodic time interval depending on the processing capability of the WEB/WAB service unit 230. The computed user reputation may be stored for each user in the user database 224, as described above.

The user reputation may be employed to estimate the probability that the user will create a high quality user content. That is because the user reputation is associated with the probability that the user will create high quality contents or that the user will provide reliable comments. For example, users who have a good reputation are expected to create good quality content and to provide reliable comments. Therefore, the user reputation may be employed to compute the content reliability.

In some embodiments, the content reliability computing unit 216 may calculate a quality of a content (i.e., a content reliability) based on information including at least one of the user reputation of the content author (i.e., a content author reputation), the ratings, the Hit Count, the Favorited Count, and the serving period of the contents. In some embodiments, the Hit Count and the Favorited Count may be the average daily Hit Count and the average favorite count stored in the contents database 222. When the Hit Count stored in the contents database 222 is the total hit count of each content $SC_i$ (Content hit count), the content reliability computing unit 216 may compute the average daily hit count $Mv_i$ for each content i using the duration of public availability of the content $SC_i$ (Period), as follows:

$$Mv_i = \text{Content hit count}/\text{Period} \quad \text{[Equation 12]}$$

When the Favorited Count stored in the contents database 222 is the total Favorited Count of each content $SC_i$ (Total Favorited Count), the content reliability computing unit 216 may compute the average daily favorited count $Mf_i$ for each content $SC_i$, using the duration of public availability of the content $SC_i$ (Period), as follows:

$$Mf_i = \text{Content hit count}/\text{Period} \quad \text{[Equation 14]}$$

In some embodiments, the content reliability computing unit 216 may normalize at least one of the content author reputation, the ratings, the Hit Count, the Favorited Count. In some embodiments, the normalized rating $Cr_i$ for each content $SC_i$, may be calculated as follows:

$$Cr_i = \text{AverageRatingScore}/M \quad \text{[Equation 15]}$$

wherein AverageRatingScore is the average rating for each content $SC_i$, and M is a maximum point M (e.g., "5") which can be given to contents.

In some embodiments, the normalized average hit $Cv_i$ for the searched content $SC_i$ may be calculated by dividing the average hit $Mv_i$ for the searched content $SC_i$ by the sum of the averages hit counts $Mv_1$ to $Mv_n$ for all searched contents $SC_1$ to $SC_n$. In other embodiments, the normalized average hit $Cv_i$ for the searched content $SC_i$ may be calculated by dividing an average hit $Mv_i$ for the searched content $SC_i$ by a maximum value among the average hit counts $Mv_0$ to $Mv_{m-1}$ for other searched contents $SC_0$ to $SC_{m-1}$, as follows:

$$Cv_i = Mv_i / \text{Max}(Mv_0, \ldots, Mv_{m-1}) \quad \text{[Equation 16]}$$

It will be appreciated that the normalized average hit counts $Cv_0$ to $Cv_m$ may be computed in a different matter such that the sum of the normalized average hit counts $Cv_0$ to $Cv_m$ is equal to 1. In some embodiments, the normalized average favorited count $Cf_i$ for each content $SC_i$ may be calculated by dividing the average daily favorited count $Mf_i$ for each content $SC_i$ by the sum of the average daily favorited counts $Mf_1$ to $Mf_n$ for all searched contents $SC_1$ to $SC_n$. In other embodiments, the normalized average favorited count $Cf_i$ for each content $SC_i$ may be calculated by dividing the average daily favorited count $Mf_i$ for each content $SC_i$ by a maximum value among the average favorited counts $Mf_0$ to $Mf_{m-1}$, for other searched contents $SC_0$ to $SC_{m-1}$, as follows:

$$Cf_i = Mf_i / \text{Max}(Mf_0, \ldots, Mf_{m-1}) \quad \text{[Equation 17]}$$

It will be appreciated that the normalized average hit counts $Cf_0$ to $Cf_m$ may be be computed in a different manner such that the sum of the normalized average hit counts $Cf_0$ to $Cf_m$, is equal to 1.

In some embodiments, the normalized content author reputation $Cu_i$ for each content $SC_i$ may be calculated by dividing the user reputation $UR_i$ of the searched content $SC_i$ by a maximum content author reputation among the content author reputations $UR_0$ to $UR_{m-1}$ for all the searched contents $SC_0$ to $SC_{m-1}$, as follows:

$$Cu_i = UR_i / \text{Max}(UR_0, \ldots, UR_{m-1}) \quad \text{[Equation 18]}$$

In some embodiments, the content reliability computing unit 216 may compute a weighted sum $CR_i$ of the normalized rating $Cr_i$, the normalized average hit $Cv_i$ the normalized average favorited count $Cf_i$, and the normalized content author reputation $Cu_i$. For example, weighted sum $CR_i$ may be calculated as follows:

$$CR_i = Wr \times Cr_i + Wv \times Cv_i + Wf \times Cf_i + Wu \times Cu_i \quad \text{[Equation 19]}$$

where Wr is a content rating weight, Wv is an hit count weight, Wf is a favorited count weight and Wu is a content author reputation weight. In some embodiments, the sum of the content rating weight Wr, the hit count weight Wv, the favorited count weight Wf and the content author reputation weight Wu may be equal to 1. In some embodiments, the content rating weight Wr, the hit count weight Wv, the favorited count weight Wf and the content author reputation weight Wu may be determined according to the importance of the corresponding social activities. For example, the content rating weight Wr may set to about 0.1, the hit count weight Wv may set to about 0.3, the favorited count weight Wf may set to about 0.4 and the content author reputation weight Wu may set to about 0.2.

In other embodiments, the content reliability computing unit 216 may compute the content reliability using the user reputation and a keyword related value which may computed by using a conventional text-based search algorithm with the contents title, the tag list and the text description. In other embodiments, the content reliability computing unit 216 may compute the content reliability by applying the user reputation to one of the algorithms for recommending contents similar to a current selected content. In other embodiments, the content reliability computing unit 216 may compute the content reliability for the computation, the user reputation may be applied to an algorithm for recommending to a user the contents which are rated highly by others who are determined to have similar inclination to the user based on user profiles.

Referring to FIG. 2, the WEB/WAB service unit 230 may receive the content reliabilities from the content reliability computing unit 216, and provide a contents search result based on the content reliabilities. In some embodiment, the WEB/WAB service unit 230 may sort the searched contents according to the received content reliabilities, thereby assisting the user to find a high quality content and a good content author. In some embodiments, the WEB/WAB service unit 230 may provide the content ranking according to the content reliabilities in a descending order.

The present invention is described in terms of the particular system embodiments, but it will be appreciated that the present invention may be implemented with computer-readable instructions recorded in computer-readable recording medium. The computer-readable recording medium can be any available media in which computer system readable data can be stored. For example, the computer-readable recording medium may include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can read by a computer system. The computer-readable recording medium may embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. The computer readable recording medium may store computer-readable codes which are distributed to and executed in computer systems connected to a network. A functional program, codes and code segments for implementing the present invention may be appreciated by those skilled in the art to which the present invention pertains.

The present disclosure is not to be limited in terms of the particular embodiments described in this application, which are intended as illustrations of various aspects. Many modifications and variations can be made without departing from its spirit and scope.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A computer-implemented method, comprising:
defining a networked association between users based on social activity information related to social activities of the users on a contents sharing web site, social activities of the users including social activities between the users and the social activities of the users on the contents sharing web site;
obtaining a link relation for at least one of the users based on the defining of the networked association;
providing non-link information, the non-link information including at least one non-link item selected from the group consisting of:
an average rating of content created by the at least one of the users;
an average daily hit count of the content created by the at least one of the users; and
an average daily favorited count of the content created by the at least one of the users; and
computing a user reputation for the at least one of the users based on the obtaining of the link relation and the providing of the non-link information.

2. The computer-implemented method of claim 1, wherein the social activities of the users include:
an activity of subscribing to a channel of the at least one of the users;
an activity of registering the at least one of the users as a friend or neighbor;
an activity of viewing the content created by the at least one of the users;
an activity of adding the content created by the at least one of the users as a favorite;
an activity of adding the content created by the at least one of the users to a play list;
an activity of scoring the content created by the at least one of the users;
an activity of providing a comment on the content created by the at least one of the users, the comment including text, image, sound, video, or any combination thereof;
an activity of providing agreement/disagreement to a comment provided by the at least one of the users; or
any combination thereof.

3. The computer-implemented method of claim 2, wherein the link relation is categorized into at least one link type indicative of a type of the social activities of the users.

4. The computer-implemented method of claim 1, wherein the computing of the user reputation further comprises
weighting at least two types of the link relation and the at least one non-link item with respective weights such that a sum of the respective weights is equal to 1.

5. The computer-implemented method of claim 1, further comprising:
computing a content reliability of the content created by the at least one of the users based on the computing of the user reputation.

6. The computer-implemented method of claim 5, wherein:
the computing of the content reliability comprises
computing the content reliability based on the user reputation and the non-link information; and
the user reputation and the at least one non-link item of the non-link information are weighted with respective weights such that a sum of the respective weights is equal to 1.

7. The computer-implemented method of claim 6, further comprising:
searching the content created by the at least one of the users, the searching of the content being performed in response to a request of an other one of the users; and
providing a search result in which the content created by the at least one of the users is arranged according to the computed content reliability.

8. The computer-implemented method of claim 1, wherein content of the contents sharing web site includes the content created by the at least one of the users, the content created by the at least one of the users including an image, sound, a video, a blog, or any combination thereof.

9. A content reliability assessing system, comprising:
a social network constituting unit being implemented by a computer to define a networked association between users based on social activity information stored in a database, the social activity information being related to social activities of the users on a contents sharing web site, social activities of the users including social activities between the users and the social activities of the users on the contents sharing web site, the social network constituting unit being connected to the database and configured to store the defined networked association in the database;
a user reputation computing unit connected to the database, the user reputation computing unit being configured to obtain the defined network association from the database and store a user reputation in the database, the user reputation unit being implemented by a computer to:
obtain a link relation for at least one of the users based on the defined networked association;
compute the user reputation for the at least one of the users based on the obtained link relation; and
a content reliability computing unit connected to the database, the content reliability computing unit being configured to obtain the computed user reputation from the database, the content reliability computing unit being implemented by a computer to compute a content reliability of content created by the at least one of the users based on the computed user reputation,
wherein:
the database comprises a contents database storing non-link information, the non-link information including at least one non-link item selected from the group consisting of:
an average rating of the content created by the at least one of the users;
an average daily hit count of the content created by the at least one of the users; and
an average daily favorited count of the content created by the at least one of the users; and
the user reputation computing unit computes the user reputation based on the link relation and the non-link information.

10. The content reliability assessing system of claim 9, wherein the social activities of the users include:
an activity of subscribing to a channel of the at least one of the users;
an activity of registering the at least one of the users as a friend or neighbor;
an activity of viewing the content created by the at least one of the users;
an activity of adding the content created by the at least one of the users as a favorite;
an activity of adding the content created by the at least one of the users to a play list;

an activity of scoring the content created by the at least one of the users;
an activity of providing a comment on the content created by the at least one of the users, the comment including text, image, sound, video, or any combination thereof;
an activity of providing agreement/disagreement to the comment provided by the at least one of the users; or
any combination thereof.

11. The content reliability assessing system of claim 9, wherein:
the link relation is categorized into at least one link type indicative of a type of the social activities of the users; and
the user reputation computing unit weights at least two types of the link relation and the at least one non-link item with respective weights such that a sum of the respective weights is equal to 1.

12. The content reliability assessing system of claim 9, wherein the content reliability computing unit weights the user reputation and the at least one non-link item of the non-link information with respective weights such that a sum of the respective weights is equal to 1.

13. The content reliability assessing system of claim 12, further comprising:
a WEB/WAB service unit configured to:
search the content created by the at least one of the users in response to a request of an other one of the users; and
provide a search result in which the content created by the at least one of the users is arranged according to the computed content reliability.

14. The content reliability assessing system of claim 9, wherein content of the contents sharing web site includes the content created by the at least one of the users, the content created by the at least one of the users including an image, sound, a video, a blog, or any combination thereof.

15. A computer-readable recording medium recording computer-readable instructions that cause a computer to execute steps comprising:
defining a networked association between users based on social activity information related to social activities of the users on a contents sharing web site, social activities of the users including social activities between the users and the social activities of the users on the contents sharing web site;
obtaining a link relation for at least one of the users based on the defining of the networked association;
providing non-link information, the non-link information including at least one non-link item selected from the group consisting of:
an average rating of content created by the at least one of the users;
an average daily hit count of the content created by the at least one of the users; and
an average daily favorited count of the content created by the at least one of the users;
computing a user reputation for the at least one of the users based on the obtaining of the link relation and the providing of the non-link information; and
computing a content reliability of the content created by the at least one of the users based on the computing of the user reputation.

16. The computer-readable recording medium of claim 15, wherein the social activities of the users include:
an activity of subscribing to a channel of the at least one of the users;
an activity of registering the at least one of the users as a friend or neighbor;
an activity of viewing the content created by the at least one of the users;
an activity of adding the content created by the at least one of the users as a favorite;
an activity of adding the content created by the at least one of the users to a play list;
an activity of scoring the content created by the at least one of the users;
an activity of providing a comment on the content created by the at least one of the users, the comment including text, image, sound, video, or any combination thereof;
an activity of providing agreement/disagreement to a comment provided by the at least one of the users; or
any combination thereof.

17. The computer-readable recording medium of claim 15, wherein:
the link relation is categorized into at least one link type indicative of a type of the social activities of the users;
the computing of the user reputation includes weighting at least two types of the link relation and/or the at least one non-link item with respective weights such that a sum of the respective weights is equal to 1; and
the computing of the content reliability includes weighting the user reputation and the at least one non-link item of the non-link information with respective weights such that a sum of the respective weights is equal to 1.

18. The computer-readable recording medium of claim 17, the steps further comprising:
searching the content created by the at least one of the users, the searching of the content being performed in response to a request of an other one of the users; and
providing a search result in which the content created by the at least one of the users is arranged according to the computed content reliability.

* * * * *